INVENTOR.
William F. Klemm
BY
Harness, Dickey & Pierce
ATTORNEYS.

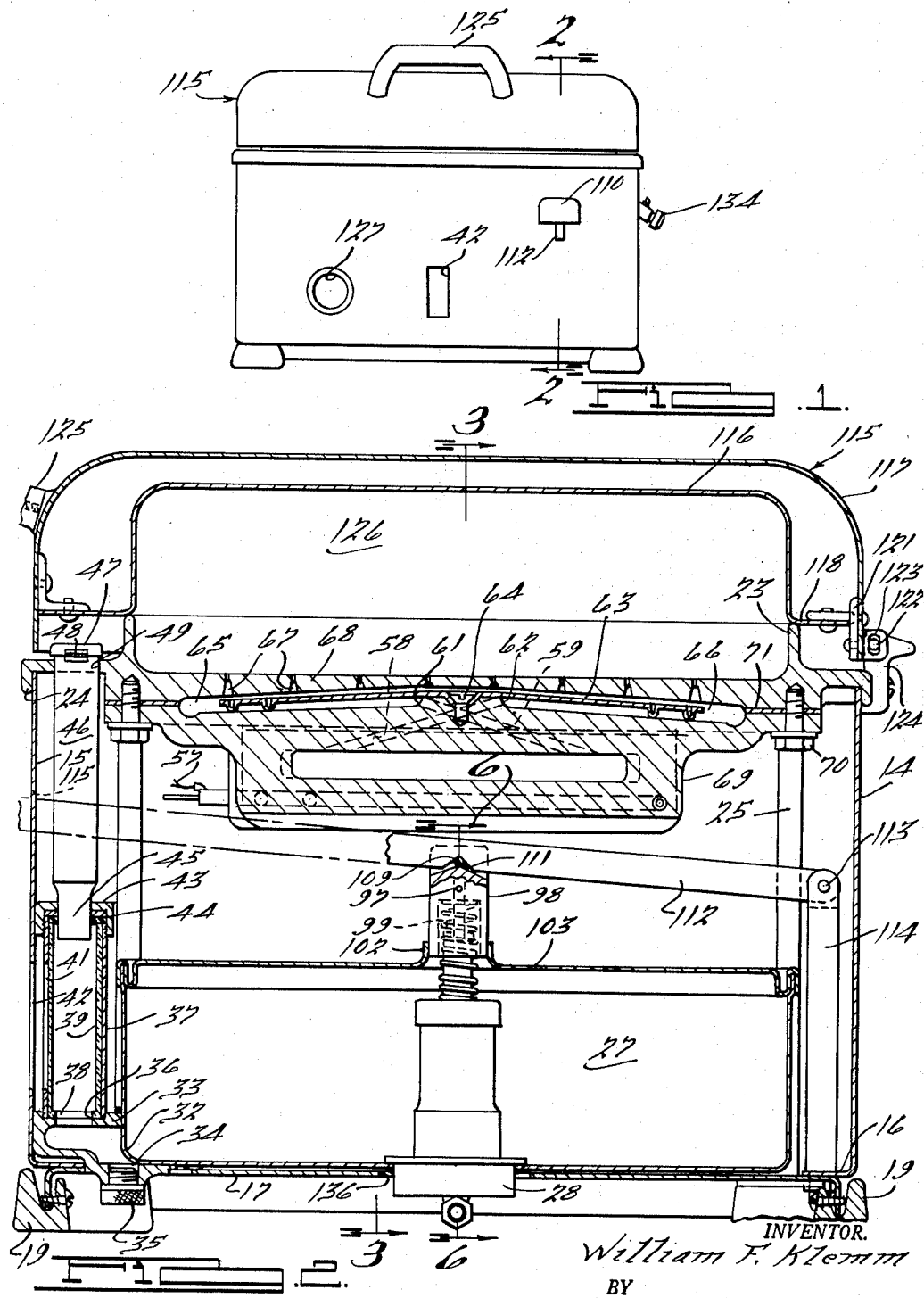

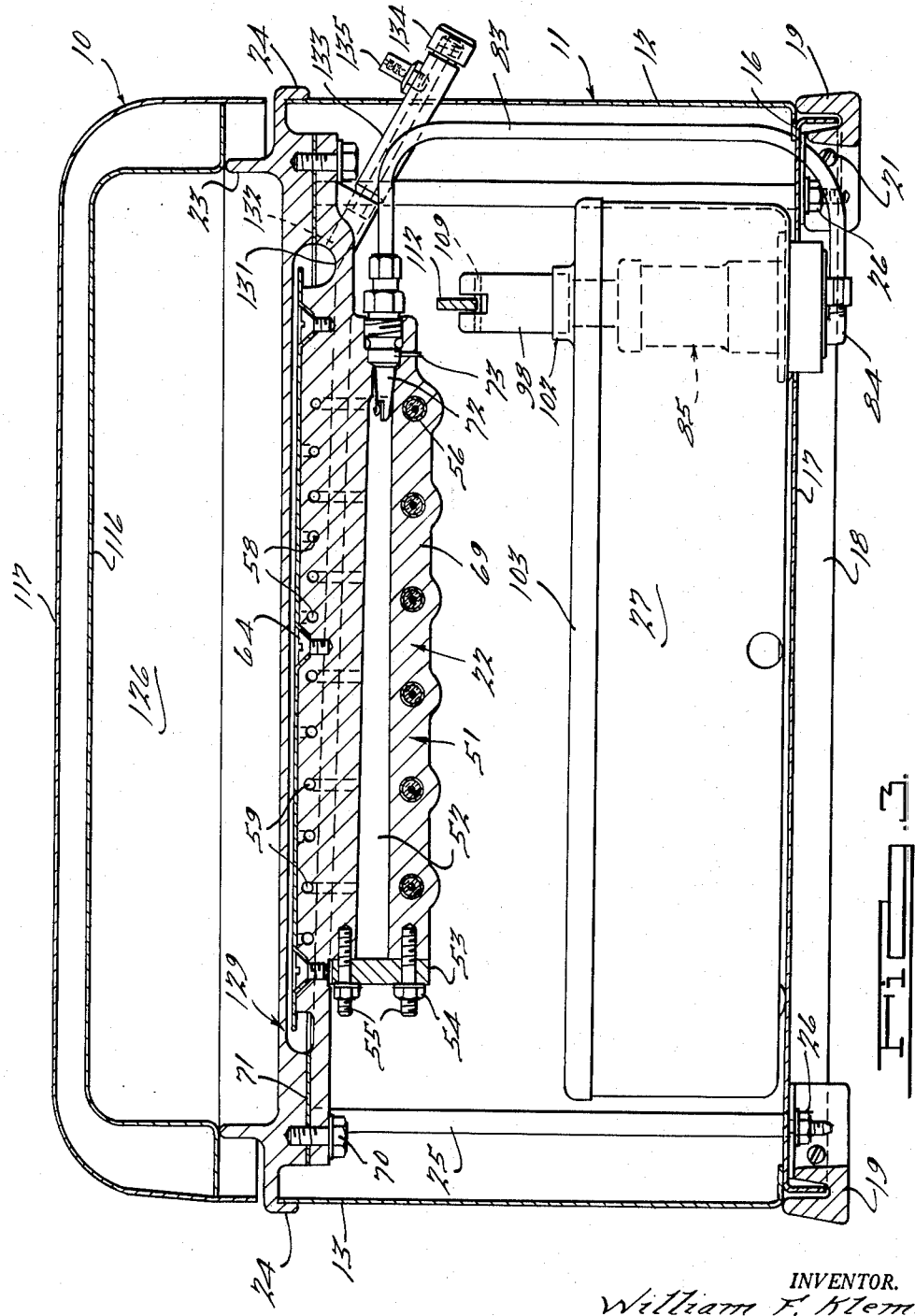

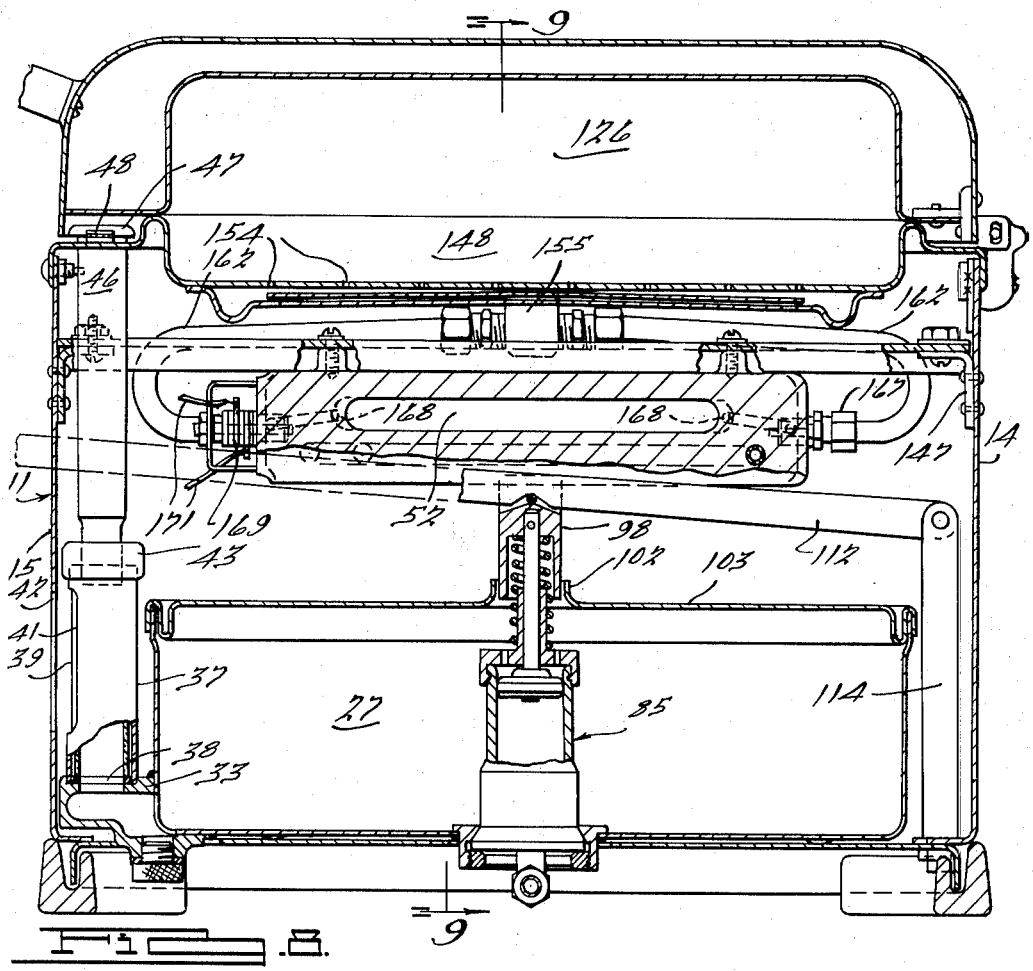
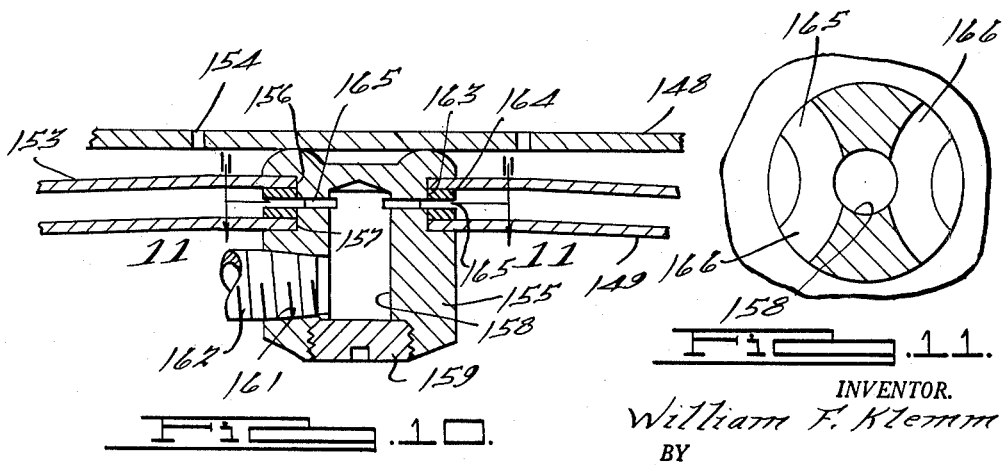

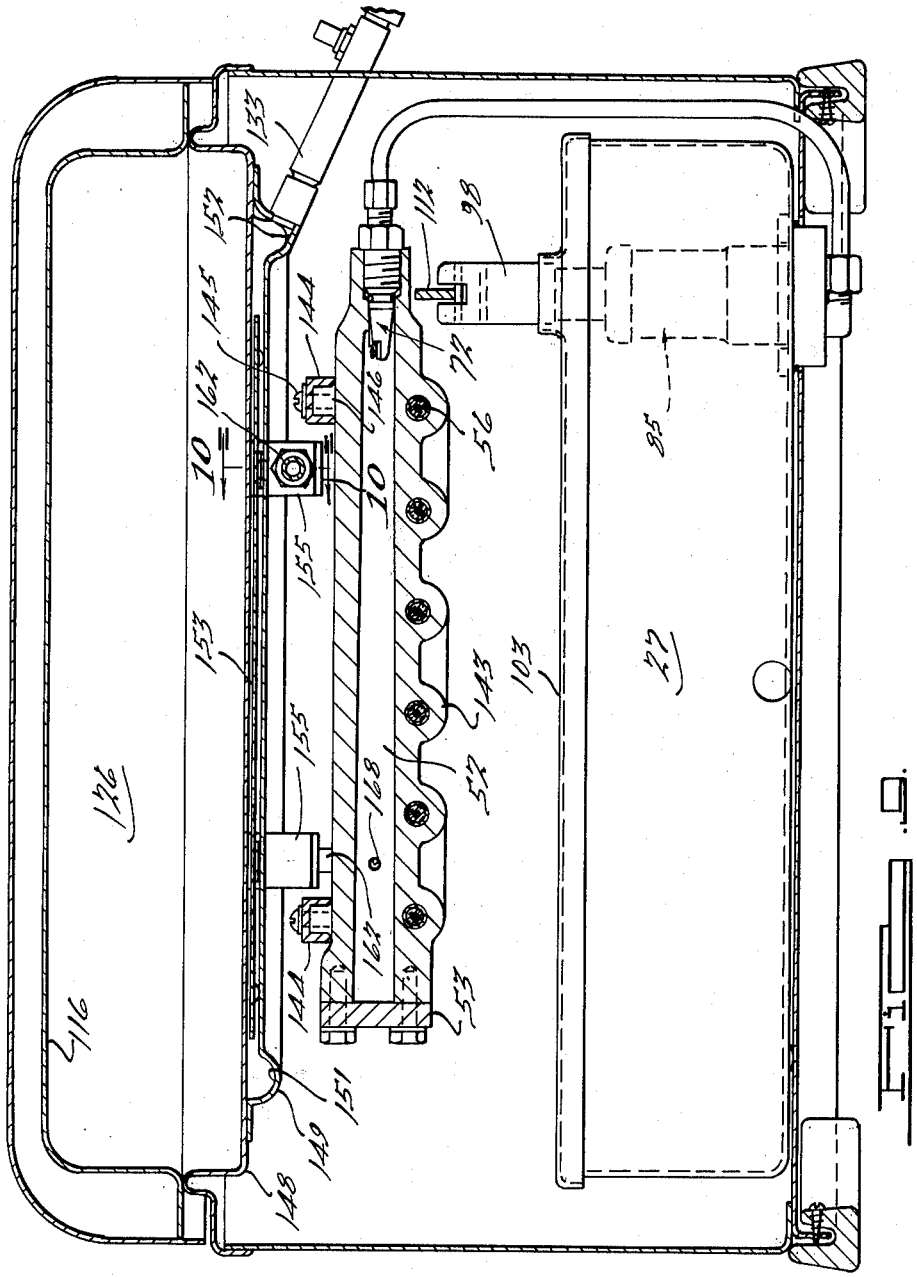

United States Patent Office 3,227,067
Patented Jan. 4, 1966

3,227,067
HEATING AND COOKING DEVICE
William F. Klemm, 17570 Prairie Ave., Detroit 21, Mich.;
John F. Langs, administrator of said William F. Klemm, deceased
Filed Aug. 3, 1961, Ser. No. 129,024
4 Claims. (Cl. 99—446)

This invention relates to article heating and food cooking devices and particularly to a device for heating and cooking food by steam which is generated within the device.

Heretofore in the art, self-contained devices have been provided in which steam is generated and directed into a compartment in which buns and other items of food are to be heated. No provision, however, was made to take care of the greases which are produced when cooking foods such as meat and the like containing fats which drip therefrom. When such devices were employed for cooking such food, they were quickly rendered inoperative because of the presence of the grease which filled the steam passageways.

The present device is somewhat similar to the devices known in the art in that steam is generated and directed into the heating compartment. The compartment, however, is so formed that the greases are free to drain through the steam delivering apertures into a sloping trough. The grease is directed to the lowest point of the trough into a collecting element from which the greases may be drained from time to time. The device is maintained operative in this manner for both heating and cooking foods whether or not they contain fatty matter. Because there is a chance that the steam passageways become partially restricted from time to time, a safety valve is provided for preventing the steam pressure from damaging the device. The heated steam from time to time will free the aperture of any clogging grease and cause it to drain through the steam delivering apertures onto a baffle plate from which the grease may drip into the trough from which it will drain into a collecting element located at the lowest point of the trough.

The device embodies a cabinet containing a reservoir for water having an inlet passageway therethrough incorporating a gauge tube by which the height of the water in the reservoir may be judged. A pump is mounted within the reservoir for taking in water when a piston is raised and for ejecting a predetermined amount of water from the downward stroke of the piston. An operating handle is employed to actuate the piston which delivers a predetermined amount of water into the chamber of a steam generator. The chamber is contained within a casting of heat conducting material such as aluminum, in which a heating element is supported. The heated chamber immediately generates steam which is conducted by passageways in the casting to an area below a baffle plate from which it passes to the top and through a plurality of apertures into the bottom of a food heating compartment formed thereby. The compartment is closed by a hinged cover to confine the steam and the foods to be heated and/or cooked therewithin. Any greases resulting from the cooking will pass down from the food cooking compartment onto the sloping baffle plate from which it will drain into a trough thereabout which slopes toward a collecting element where the grease is collected. The steam passageways and delivering apertures are maintained open at all times as the grease being cooked from the food will flow to the receiving element.

The pump is mounted in the reservoir in such a manner as to be directly releasable therefrom so that it may be repaired or replaced. The water is directed from the pump into one end of the steam compartment from a nozzle which is constructed in a manner to prevent clogging. The nozzle embodies a truncated conical body portion having a flat side at the smaller closed end on which a sealing washer is urged by a spring arm. The arm is provided with a band by which it is attached to the nozzle in a manner to be removable therefrom. The casting may be so constructed as to have the heating unit molded therewithin. A spiral slot may be provided in the casting for receiving the heating element from which it is removable in case it should become burned out.

The steam generator and food heating compartment may be a single casting or the steam generator alone may be supported within the cabinet with steam conduits leading therefrom into bosses containing steam delivering slots. The steam is directed beneath a baffle plate and around to the top surface thereof and through apertures in the bottom of the food heating compartment. The bottom plate is formed to have a trough in the outer edges thereof which drains into the receiving element for the grease. With this arrangement only the reservoir and the heating element form the unit while the article heating compartment is made from sheet metal. In any of the arrangements the construction is such as to provide means for taking care of any grease or other fluids resulting from the cooking of foods or heating articles within the heating compartment through the draining of the fluids into the trough about the bottom edges thereof.

Accordingly, the main objects of the invention are: to provide a heating and cooking device for foods and various articles which drains the grease or other fluids from the compartment and steam passageways to prevent the clogging thereof; to provide a trough about the edges of the cooking and heating compartment which has a continuous slope to a fluid collecting area which is provided with a safety valve; to form the bottom of the compartment and the steam generating area from a single casting having incorporated therein a baffle plate which slopes toward a grease collecting trough which is heated by the steam which is directed therebelow and which passes to the area thereabove and through the apertures into the heating compartment; and in general, to provide a heating and cooking device for foods and articles which is simple in construction, positive in operation and economical of manufacture.

Other objects and features of novelty of the invention will be specifically pointed out or will become apparent when referring, for a better understanding of the invention, to the following description taken in conjunction with the accompanying drawings wherein:

FIGURE 1 is a view in elevation of a heating and cooking device embodying features of the present invention;

FIG. 2 is an enlarged sectional view of the structure illustrated in FIG. 1, taken along the line 2—2 thereof;

FIG. 5 is a plan view of the structure illustrated in FIG. 4, as viewed from point 5 thereof;

FIG. 8 is a view of structure, similarly illustrated in FIG. 2, showing a further form of the invention;

FIG. 9 is a sectional view of the structure illustrated in FIG. 8, taken on the line 9—9 thereof;

FIG. 10 is an enlarged sectional view of the structure illustrated in FIG. 9, taken along the line 10—10 thereof, and FIG. 11 is a broken sectional view of the structure illustrated in FIG. 10, taken on the line 11—11 thereof.

Figure 4:
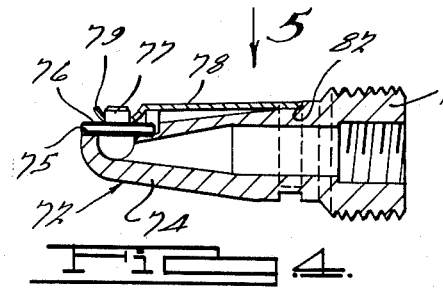
FIG. 4 is a sectional view of the nozzle illustrated in FIG. 5, taken along the line 4—4 thereof.
Figure 3:
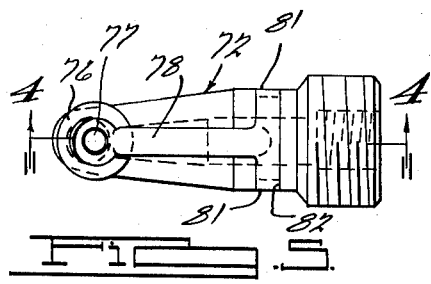
FIG. 3 is a sectional view of the structure illustrated in FIG. 2, taken on the line 3—3 thereof.

Referring to FIGS. 1 to 6, the heating and cooking device of the present invention embodies a cabinet 11 having end walls 12 and 13 and side walls 14 and 15. The walls have an inwardly directed flange 16 at the bottom to which a plate 17 is secured by welding or other means. The plate 17 has a downwardly extending flange 18 about its edges to the corners of which supporting blocks 19 are secured by screws 21. A steam generating device 22 has upwardly extending flanges 23 which form the bottom of the heating and cooking compartment and outwardly and downwardly extending flanges 24 which rest upon the top of the cabinet walls 12, 13, 14 and 15. The device 22 is secured in position by four bolts 25 which extend through the plate 17 and are secured by nuts 26.

A reservoir 27 is mounted on the plate 17 and provided with an aperture at the bottom to which a bushing 28 is welded or otherwise secured. The bushing 28 has a truncated conical surface 29 and a threaded section 31 therebelow for securing a pump thereto. The reservoir also has an aperture 32 near the central bottom edge through which water is admitted to the reservoir. The aperture 32 has a boss 33 brazed, welded or otherwise secured thereover, the boss being provided with a drain opening 34 closed by a removable plug 35 upon the removal of which the reservoir 27 can be drained. The boss 33 has a recess 36 in which a metal tube 37 is supported along with a washer 38 which seals a transparent tube 39 at one end. The tube 37 is provided with a slot 41 aligned with a slot 42 in the side 15 of the cabinet 11 through which the water level within the tube 39 may be viewed. A hollow cap 43 is threaded upon the tube 37 having a washer 44 therein which seals the transparent tube 39 at the upper end thereof and also the end 45 of a fill-tube 46 which extends through the cap 43. The top of the fill-tube 46 is closed by a cover 47 which is secured thereto by a hinge 48. The tube 46 is supported in an aperture 49 in the outwardly and downwardly extending flange 24 of the steam generating device 22. When it is found through viewing the tube 39 that the level of the water in the reservoir 27 requires replenishing, water is supplied to the reservoir through the tube 46 after the cap 47 has been pivoted upwardly on the hinge 48. If it is desired to drain the water from the reservoir 27, the plug 35 is removed from the aperture 34 permitting the water to pass therefrom.

The steam generating device 22 embodies a two-piece casting 51 having a rectangular aperture 52 therein, having the open end closed by a plate 53 secured in position by nuts 54 on the studs 55. The portion of the casting below the aperture 52 has an insulated heating element or coil 56 of the Calrod type embedded therein with terminal ends 57 extending therefrom which are connected in the electric circuit in a manner well known in the art. Steam passageways 58 and 59 extend from the edges of the aperture 52 to the center of the casting from which they terminate at the discharge openings 61 and 62. The steam from the ends of the passageway strike the underside of a baffle plate 63 which is secured to the casting by a plurality of screws 64. The baffle plate 63 slopes downwardly to the left and right from the line of screws 64 along the center so as to direct steam sidewardly to the edges of the apertures 65 and 66 from which it will pass upwardly and over the top of the baffles and through the plurality of apertures 67 in an upper casting portion 68. The casting portion 68 is secured to a bottom casting portion 69 by bolts 70 which are threaded thereinto and which secures the bottom casting portion against a sealing gasket 71 disposed between the casting portions.

The opposite end of the casting 51 from that containing the plate 53 has a nozzle 72 threaded thereinto and secured in upright relation by a pin 73. The nozzle, illustrated more specifically in FIGS. 4 and 5, embodies a cylindrical threaded end portion 73 from which a truncated conical portion 74 extends. The forward, upper portion of the truncated conical end is machined to provide a flat seat 75 upon which a washer 76 having an upwardly extending boss 77 is mounted. A spring finger 78 has an arcuate end portion 79 containing an aperture which receives the upwardly extending boss 77 of the washer. The arm 78 has arcuate side portions 81 which extend within a slot 82 at the base of the truncated conical portion. The spring exerts a predetermined downward force on the washer 76 to maintain it on its seat 75 with a predetermined pressure to cause the steam to escape from the nozzle in a flat forwardly directed path within the diverging slot 52 of the casting 51. The nozzle is connected by a conduit 83 to an elbow 84 in the bottom of a pump 85.

Figure 6:
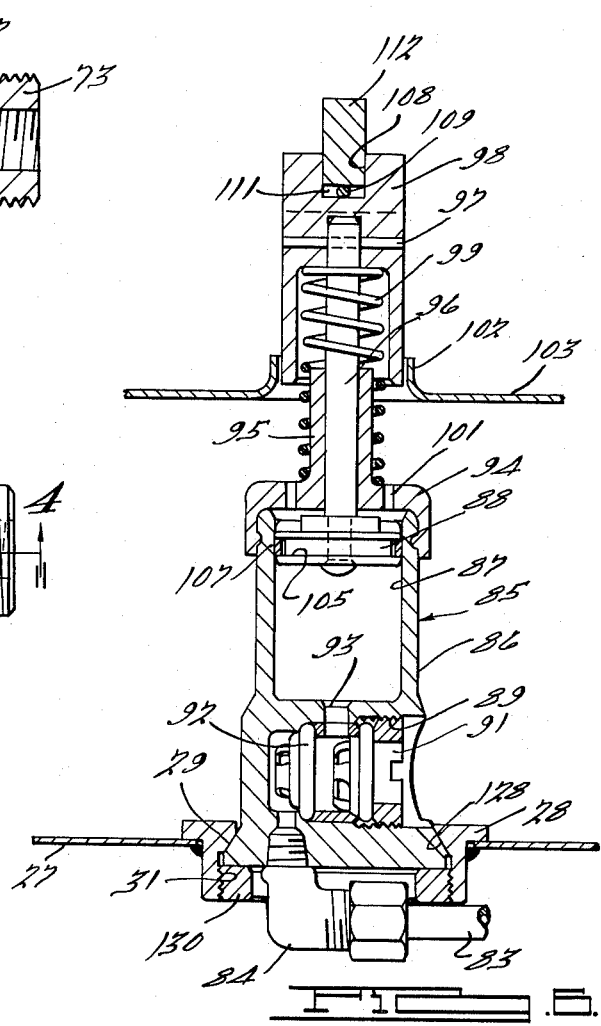
FIG. 6 is an enlarged sectional view of the structure illustrated in FIG. 1, taken on the line 6—6 thereof.

The pump 85, as illustrated in FIG. 6, comprises a housing 86 having a cylinder 87 containing a piston 88. The housing has an aperture 89 containing a suction valve 91 and an exhaust valve 92 of conventional form. Between the valves the bottom of the cylinder has a passageway 93 to which fluid is drawn through the valve 91 upon the up stroke of the piston and exhausted through the valve 92 upon the down stroke thereof into the elbow 84 and to the conduit 83. The cylinder 87 is enclosed by a cap 94 having a sleeve 95 on the upper end which guides a rod 96 which is connected to the piston. The rod is secured by a pin 97 to a cylindrical hollow bushing 98 containing a spring 99 which is disposed about the sleeve 95 with the lower end resting upon the cap 94. The cap 94 is provided with apertures 101 in the top thereof for the passage of air therethrough. The bushing 98 extends through an upwardly directed cylindrical flange 102 in a cover 103 of the reservoir.

The piston 88 embodies a cylindrical element 104 of brass or other metal construction, having a peripheral groove 105 and a central aperture 106 through which the end of the rod 96 extends and to which it is secured as by swaging the rod end. A sealing element 107 which may be a sealing type piston ring but which is preferably a stainless steel ring having a Teflon face provided thereon. The Teflon face substantially reduces the friction between the surface of the cylindrical portion 87 of the casting 85 and the piston 88. The upper end of the cylindrical bushing 98 contains a slot 108 having in the bottom thereof a pin 109, which is engaged by a notch 111 in an operating lever 112. The lever has one end secured by pivot 113 to a standard 114 which is secured to the flange 16 of the side 14 of the cabinet. The lever 112 extends through an aperture 115 in the side 15 of the cabinet 11, being provided with a handle 110 by which the operating lever 112 may be moved downwardly to move the piston 88 downwardly within the cylinder 87 and force a predetermined amount of water out through the passageway 93, the valve 92, the elbow 84, the conduit 83 to the nozzle 72, from which it is sprayed uniformly along the aperture 52 of the casting 51. Only one such movement of the lever 112 is necessary to meter a predetermined required amount of water into the aperture 52 which immediately converts the water into steam which is forced by pressure into the heat compartment in which the food or articles are to be conditioned. The compartment 126 is formed by the casting portion 68 and the flange 23 thereof, along with the top cover 115 of the device. The top cover is formed of an inner inverted dish-shaped stamping 116 and an outer inverted dish-shaped stamping 117. The stamping 116 has a lateral extending flange 118 which is secured by angle elements 119 to the outer dish-shaped stamping 117 along the edges thereof and also by the hinge element 121 which is riveted thereto. The hinge element 121 has a pin 122 which is disposed in a slot 123 in a hinge element 124 which is secured to the outwardly and downwardly extending flange 24 of the casting 51. A pair of such hinges is sufficient to permit the cover 115 to be raised by the handle 125. The interior of the dish-shaped stamping 116 of the cover 115 forms the compartment 126 with the bottom portion and flange 23 of the casting 68.

The wiring diagram for the device is not herein illustrated as it is believed unnecessary because of its simplicity. When the circuit is turned on a light is visible in the rear of a red warning glass 127, the temperature being maintained at a predetermined maximum level by a thermostat in a manner well known in the art. The device is exceedingly simple employing parts which are readily interchanged or serviced, utilizing a spray nozzle which is impossible to plug and having a pump which will require substantially no service. Should the pump require repair or replacement, the bottom portion of the housing 86 has a truncated portion 128 which mates with the truncated surface 29 of the bushing 28 being secured in sealed relation thereto by a hollow spanner nut 128. Once the casting 51 has been heated the cover 115 is raised and the articles or food to be heated or cooked are placed within the bottom portion of the compartment 126 after which the cover is closed. Thereafter the handle 110 is moved downwardly its full stroke to force the piston downwardly a predetermined amount to eject the water within the cylinder 87 outwardly through the passageway 93 through the valve 92, elbow 84, conduit 83, and out of the nozzle 72. Since the casting is heated the sprayed water will immediately be converted to steam and pass from the apertures 58 and 59 and through the openings 61 and 62 below the baffle plate 63 to the side edges from which it will move over the top of the baffle plate and out through the apertures 67 in the casting portion 68 which forms the bottom of the compartment 126. In this manner, super heated steam is directed about the food or articles in the compartment and heated substantially instantaneously throughout the inner and outer parts thereof. While it has been stated that the device is a food warmer and cooker, it is to be understood that articles other than food such as those to be sterilized, polio blankets and the like may be heated to desired temperatures substantially instantaneously within the device. Should, as pointed out hereinabove, the food being cooked or articles being heated contain fats or materials which melt in the presence of the heat, such fluids will not in any manner affect the operation of the device since they wall pass downwardly through the steam apertures 67 onto the baffle 63 from which they will drain from side edges thereof into a trough 129 provided about the edge of the baffle and the passageways 65 and 66. The trough portion at the front of the device is shallow and drains to the left while that along the left hand side drains to the rear and that from the rear will drain to the right and then forwardly to the lowest point 131. At this point a passageway 132 is connected to a collecting tube 133 closed at the end by a removable cap 134 from which the hot fluids can be collected. A spring present ball-type blow-off valve 135 is mounted on the collecting tube 133 as a safety measure should stoppage occur in the steam passageways resulting in a pressure build-up within the system.

Figure 7:
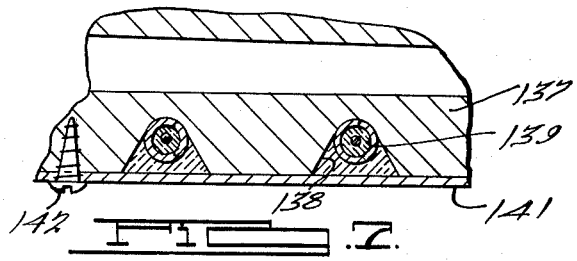
FIG. 7 is an enlarged view of structure, similar to that illustrated in FIG. 3, showing a modified form thereof.

In FIG. 7 a modified form of casting 137 is illustrated, which is similar to the casting 51 of FIGS. 1–6 with the exception that the heating element 56 is not embedded therein. Instead, the casting 137 is provided with spiral aperture 138 in which a spirally wound heating element 139 embedded in insulating material 140 is secured by a plate 141 secured thereto by a plurality of screws 142. With such an arrangement should the heating coil become defective it may be readily replaced without scrapping the entire casting as would occur when the heating unit 56 is embedded within the casting 51.

In FIGURES 8 to 11 inclusive, a further form of the invention is illustrated wherein the steam forming casting 143 has the heating unit 56 embedded therein or which may be provided with the replaceable heating unit 139, both of which have been described hereinabove. The casting has the slot 52 therein with the nozzle 72 mounted at one end and the enclosure plate 53 secured thereto at the other end. The casting is secured to a pair of downwardly presenting channel supporting elements 144 by screws 145 extending into threaded bushings 146 of the castings. As illustrated in FIG. 8 the channel-shaped supporting elements are secured to angle-shaped brackets 147 riveted or otherwise secured to the front and back portions 14 and 15 of the cabinet 11. The reservoir, pump, inlet and outlet for the water and steam are the same as has been described hereinabove with regard to the structure of FIGS. 1 to 6. In the present arrangement the bottom of the compartment 126 is formed of a stamping 148 having apertures 154 in the bottom through which the steam passes. A second stamping 149 is welded to the bottom of stamping 148 and is provided with a trough 151 which drains into the lower outlet aperture 152 to which the drain tube 133 is welded or otherwise secured. Between the stampings 148, 149, a baffle plate 153 is provided similar to the baffle plate 63 described hereinabove. Steam when admitted below the baffle plate 153 is forced around the side edges thereof and upwardly thereover against the bottom of the stamping 148 and through the plurality of apertures 154 contained therein into the heating compartment 126.

Steam is admitted below the baffle plate 153 through the heads 155 which are secured in apertures 156 and 157 in the baffle plate 153 and stamping 149 respectively. Each head 155 has a central aperture 158 closed at the bottom by a removable plug 159 and communicating through a threaded aperture 161 with a conduit 162 which is threaded thereinto. The head has a reduced cylinder portion 163 containing a spacer washer 164 disposed between the baffle plate 153 and stamping 149 when the reduced portion 163 is inserted through the apertures 156 and 157. Thereafter, the reduced end of the head 155 is swaged over to clamp the baffle plate 153 and stamping 149 in fixed relationship thereto. Passageways for steam 165 are formed in the washer 164 and head 155 by circular milling cuts 166 formed on opposite sides thereof so as to direct the steam toward the sides of the cabinet between the baffle plate 153 and the bottom stamping 149. The steam must then pass about the side edges of the baffle plate 153 and across the top thereof before it can pass out through the apertures 154 of the stamping 148.

The conduits 162 from the pair of heads 155 extend in opposite directions therefrom as clearly illustrated in FIG. 8. The conduits are connected by fittings 167 to opposite sides of the casting 143 to communicate through passageways 168 with the internal aperture 52 of the casting in which the steam is generated. The steam will be forced out through the passageways 168 through the conduits 162, to the heads 155 and then into the heating compartment 126 as pointed out hereinabove.

Referring more particularly to FIG. 8, a thermostat 169 is illustrated as being mounted on the casting to control the maximum heat thereof. The thermostat is connected by conducting leads 171 to the electric circuit in the manner well known in the art and as disclosed in the above set forth application. The stampings 148, 149, baffle 153 and the stampings 116 and 117 of the cover, are preferably made of stainless steel so as to resist corrosion and contamination from the foods, greases or other substance with which they come in contact when heated. A further advantage is this arrangement is that the casting 143 with the heating element 56 therein may be discarded should the heating element become defective so that replacement may be made at a very low cost.

In either of the devices, irrespective of what materials are employed or how the steam system is constructed, fatty foods or other articles may be cooked throughout in a very short time without the greases or other generated fluids in any way interfering with the repeated use of the device. Any stopping of apertures or clogging of the device is avoided by the collection of the flowing fluids in a trough which slopes to a point at which they are collected and removed from the device to avoid any substantial accumulation thereof. When the device is heated it is always at sufficient temperature to render the liquids fluid so that they will flow from the heating compartment onto the baffle, into the trough and to the collecting reservoir. The pump may be made of plastic material except for the rod, spring and piston body to reduce the cost of the materials, the machining thereof and to prevent corrosion. The pump is constructed at a very low cost and if defective for any reason may be readily replaced.

What is claimed is:

1. In a food heating device containing a heating compartment, members forming a steam compartment, one of said members containing a steam generating compartment communicating with said steam compartment, when the members are secured together in unit relation, said heating compartment having small steam jet aperture means intercommunicating with said steam compartment for delivering live steam under pressure from said steam compartment to said heating compartment, and trough means secured in said steam compartment beneath said aperture means for collecting fats and other fluids which drip from said food when heated in said heating compartment through said aperture means when the steam under pressure no longer passes therethrough.

2. In a food heating device forming a heating compartment, members forming a steam compartment, one of said members forming a steam generating compartment communicating with said steam compartment when the members are secured together in unit relation, said heating compartment having small steam jet aperture means inter-communicating with said steam compartment for delivering live steam under pressure from said steam compartment to said heating compartment, a baffle plate secured in said steam compartment below said aperture means onto which fats and other fluids collected from the food heated in said heating compartment drip from said aperture means when the steam under pressure is no longer delivered therethrough, and trough means in said steam compartment adjacent to the edges of the baffle plate in which the fats and other fluids draining from said baffle plate are collected.

3. In a food cooking device forming a cooking compartment, members forming a steam compartment, one of said members forming a steam generating compartment communicating with said steam compartment when the members are secured together in unit relation, said cooking compartment having small steam jet aperture means inter-communicating with said steam compartment for delivering live steam under pressure from said steam compartment to said cooking compartment, a baffle plate secured in said steam compartment below said aperture means onto which fats and other fluids from the cooked foods drip from said aperture means when the steam under pressure is no longer delivered therethrough, and trough means in said steam compartment about the edges of the baffle plate in which the fats and other fluids draining from the baffle plate edges are collected.

4. In a food cooking device forming a cooking compartment, members forming a steam compartment, one of said members forming a steam generating compartment communicating with said steam compartment when the members are secured together in unit relation, said cooking compartment having small steam jet aperture means inter-communicating with said steam compartment for delivering live steam under pressure from said steam compartment to said cooking compartment, a baffle plate secured in said steam compartment below said aperture means onto which fats and other fluids from the cooked foods drip from said aperture means when the steam under pressure is no longer delivered therethrough, trough means in said steam compartment about the edges of the baffle plate in which the fats and other fluids draining from the baffle plate edges are collected, said trough means sloping to an outlet opening, and a collecting element at said opening into which said fats and fluids in said trough means drain.

References Cited by the Examiner
UNITED STATES PATENTS

| | | | |
|---|---|---|---|
| 1,260,720 | 3/1918 | Shattuck | 99—417 |
| 1,452,907 | 4/1923 | Campbell | 99—446 |
| 1,976,219 | 10/1934 | Fletcher et al. | 99—417 |
| 2,138,908 | 12/1938 | Douthitt | 99—444 |
| 2,526,974 | 10/1950 | Schipanski | 99—234 |
| 2,674,935 | 4/1954 | Lewis et al. | 99—234 |
| 2,881,798 | 4/1959 | Oakes | 137—565 |
| 2,962,049 | 11/1960 | Steidley | 137—565 |
| 2,973,705 | 3/1961 | Klemm | 99—426 X |

WALTER A. SCHEEL, *Primary Examiner.*

JOSEPH D. BEIN, JEROME SCHNALL, *Examiners.*